Fig. 1

No. 664,787. Patented Dec. 25, 1900.
W. E. SIMPSON.
FLUID PRESSURE MOTOR.
(Application filed May 28, 1900.)
(No Model.) 11 Sheets—Sheet 2.

Attest
Walter Donaldson
O. F. Middleton

Inventor
William Edmund Simpson
by F. L. Middleton
Atty.

THE NORRIS PETERS CO., PHOTO-LITHO., WASHINGTON, D. C.

Fig. 5.

No. 664,787. Patented Dec. 25, 1900.
W. E. SIMPSON.
FLUID PRESSURE MOTOR.
(Application filed May 28, 1900.)
(No Model.) 11 Sheets—Sheet 4.

No. 664,787. Patented Dec. 25, 1900.
W. E. SIMPSON.
FLUID PRESSURE MOTOR.
(Application filed May 28, 1900.)

(No Model.) 11 Sheets—Sheet 6.

Fig. 8.

Attest
Walter Donaldson
C. Middleton

Inventor
William Edmund Simpson
by F. L. Middleton
Atty.

No. 664,787. Patented Dec. 25, 1900.
W. E. SIMPSON.
FLUID PRESSURE MOTOR.
(Application filed May 28, 1900.)
(No Model.) 11 Sheets—Sheet 7.

No. 664,787. Patented Dec. 25, 1900.
W. E. SIMPSON.
FLUID PRESSURE MOTOR.
(Application filed May 28, 1900.)
(No Model.) 11 Sheets—Sheet 10.

Fig. II.

Attest
Inventor
William Edmund Simpson

UNITED STATES PATENT OFFICE.

WILLIAM EDMUND SIMPSON, OF LONDON, ENGLAND.

FLUID-PRESSURE MOTOR.

SPECIFICATION forming part of Letters Patent No. 664,787, dated December 25, 1900.

Application filed May 28, 1900. Serial No. 18,254. (No model.)

*To all whom it may concern:*

Be it known that I, WILLIAM EDMUND SIMPSON, a subject of the Queen of England, and a resident of 28 Victoria street, Westminster, London, England, have invented certain new and useful Improvements in and Relating to Fluid-Pressure Motors, (for which I have applied for a patent in Great Britain, No. 9,978, bearing date May 11, 1899,) of which the following is a specification.

The invention relates to the construction of gas, steam, and other fluid-pressure motors; and it consists in so providing the constituent parts of which the motor is built as to render them capable of being readily assembled and combined to form motors of varying types and powers. By such construction the cost of production is greatly reduced and by its means a motor may at any time be conveniently altered in type by assembling its component parts in a different way or be conveniently increased in power by adding a set of parts.

The invention is illustrated in the accompanying drawings, in which—

Fig. 8$^a$ is a back view showing the method employed according to the invention of coupling up the
constituent parts of the motor, while
Fig. 10 is a vertical section similar to Fig. 1 of a motor in which a water-jacketed cylinder is employed, while
Fig. 11 is a sectional plan on the line X Y, Fig. 10.

In the drawings the invention is shown as adapted to an oil-motor of the "Otto" or four-stroke cycle.

As illustrated in Figs. 1 to 9, each cylinder $a$ is cast in one with a cylindrical crank-chamber $b$, having circular end flanges $b'$ or facings, to which are bolted end covers $c$, which are provided with bearings $c'$ for the crank-shaft $d\ d'\ d^2$ and with feet or holding-brackets $c^2$, by means of which the combined structure may be bolted to its foundation or by which it may be secured upon a tubular frame, such as $e\ e$, by such means as supplementary and opposing gripping-jaws $f$, which with the feet or holding-brackets $c^2$ firmly embrace the members $e\ e$ of the frame by means of bolts $g$, as illustrated more particularly in Figs. 2, 3, 4, and 5, the gripping-jaws $f$ bearing upon a nose $c^6$, provided upon the end face of the feet or holding-brackets $c^2$, so that their engaging extremities may be drawn to firmly grip the frame parts.

Figure 5:
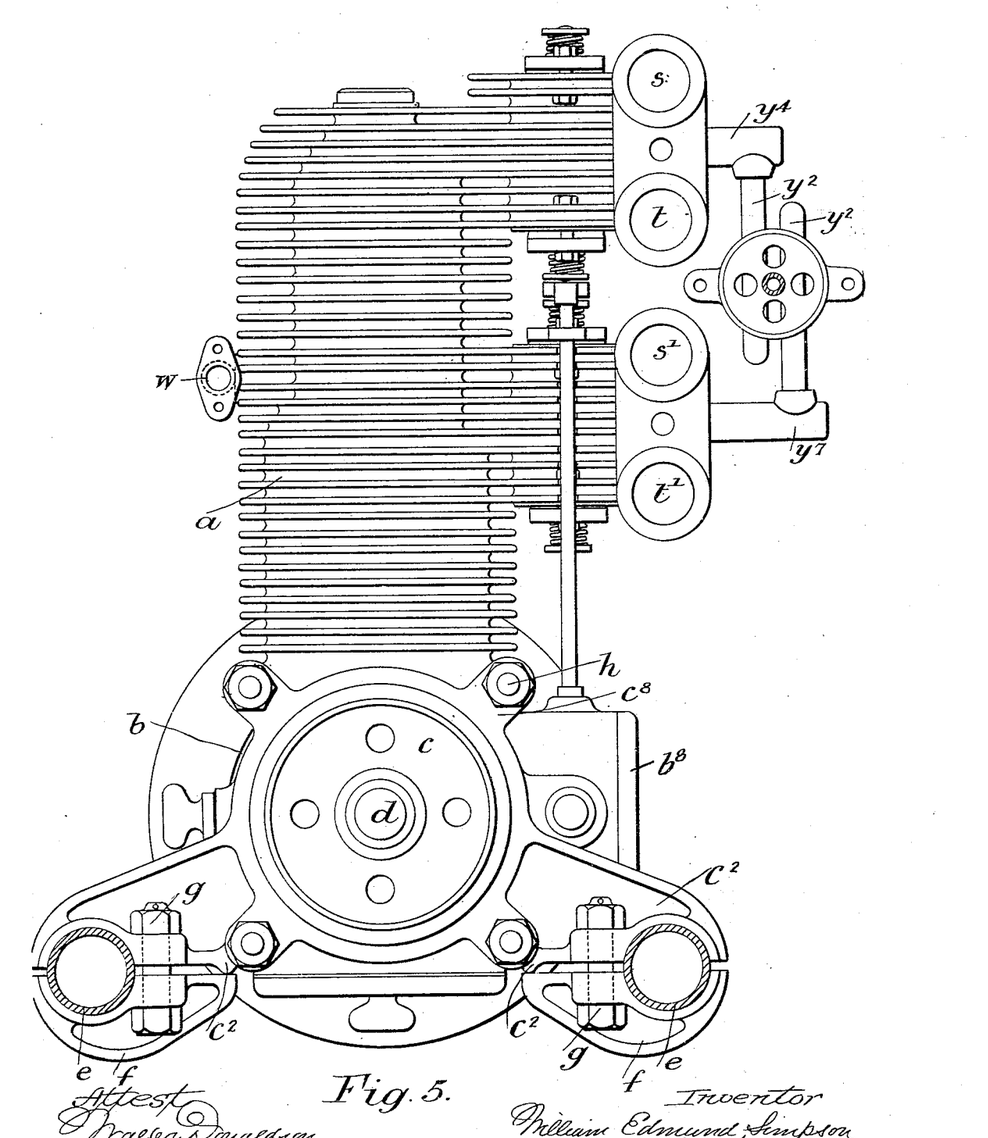
Figs. 5 and 6 are elevations corresponding to Fig. 1, in which the feet are arranged for vertical mounting and horizontal mounting, respectively.
Figure 6:
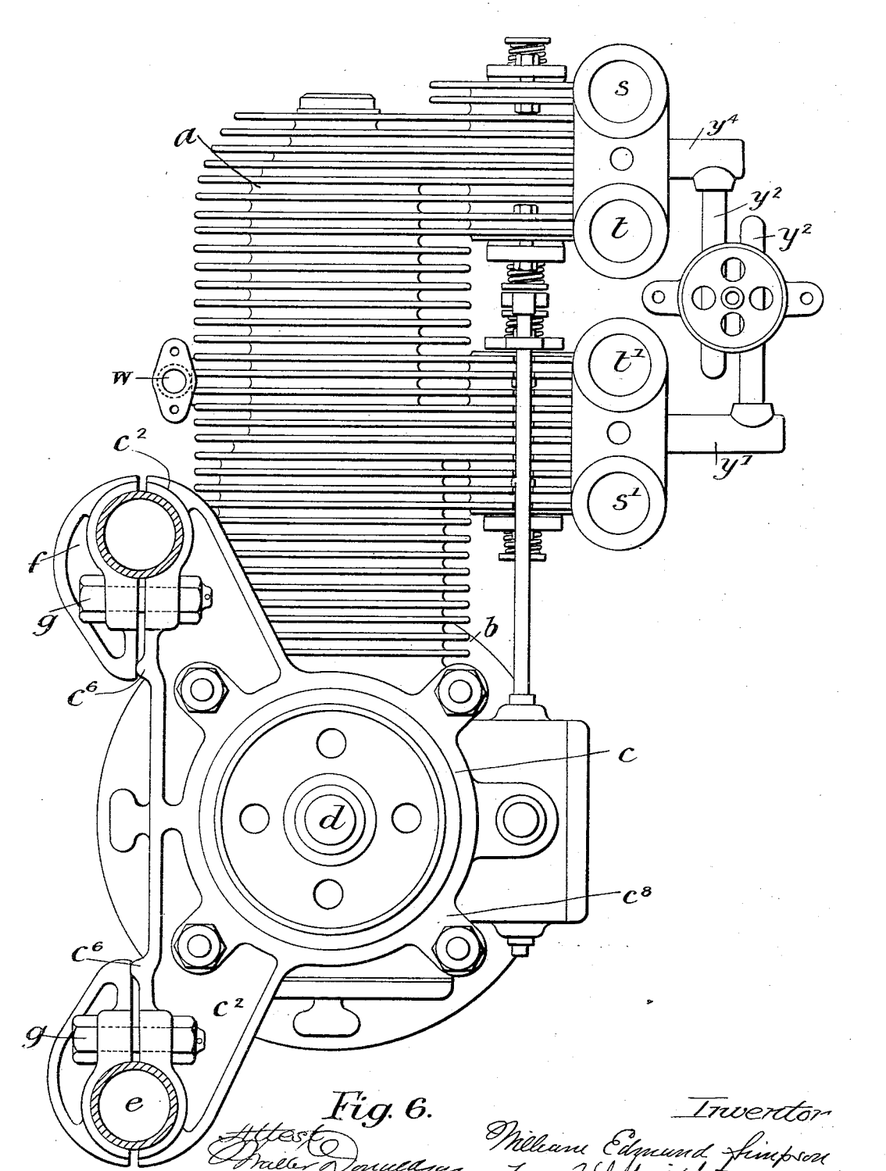
Figure 8:
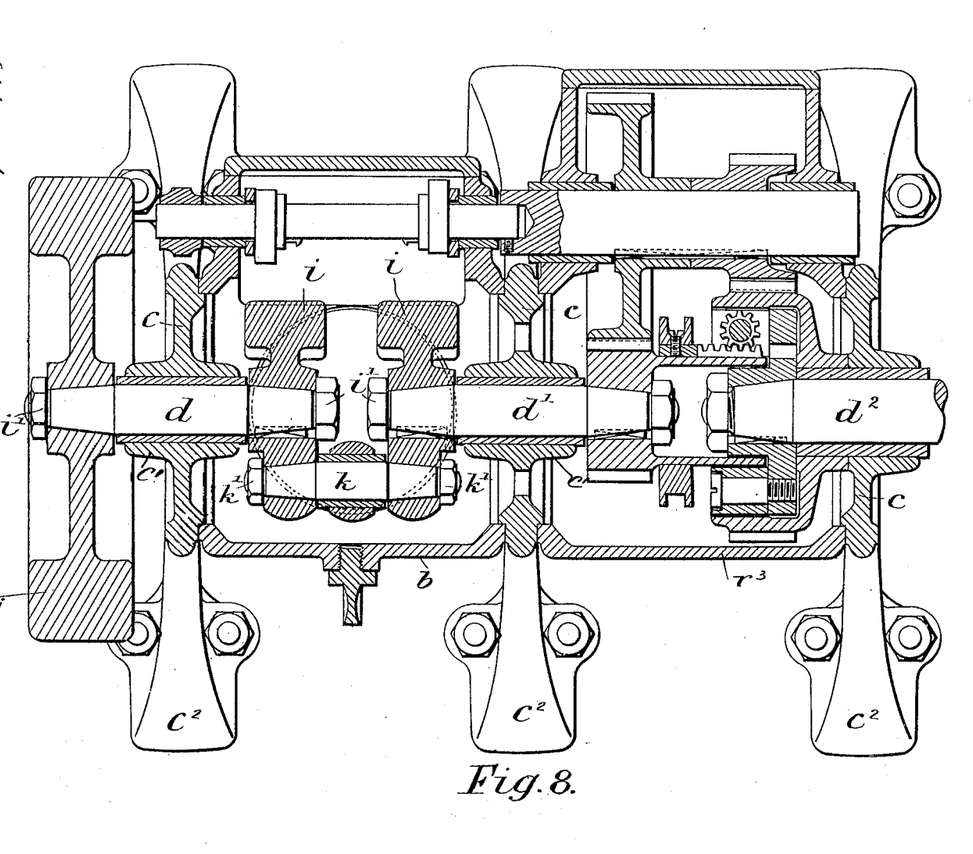
Fig. 8 is a sectional plan of a single-cylinder motor and speed-gear.

Bolt-holes are provided in the covers $c$, preferably within peripheral lugs $c^8$, and are arranged equidistant around the center of the cover to coincide with holes provided on peripheral lugs $b^{11}$, Fig. 8$^a$, provided upon the crank-chamber $b$, so that the covers may be bolted in any angular position so as to bring the feet or holding-brackets $c^2$ in any such position that the motor may with the same parts be suspended, arranged vertically, as illustrated in Fig. 5, or horizontally, as in Fig. 6. Each cover $c$ has facings $c^4$ upon both sides, so that another crank-chamber and cylinder may be bolted against it, the bolts $h$ then passing through two lugs $b^{11}$ of the respective crank-chambers and through the intermediate cover $c$, as illustrated in Fig. 8$^a$, the cover $c$ then serving as a distance-piece. Thus it will be understood that any number of cylinders or units may be combined to any power up to the limit of the crank-shaft. The crank-shaft is made up of uniform sections and comprises short pieces of shaft $d\ d'\ d^2$, preferably having conical extremities, upon which are mounted counterbalanced crank-arms $i$ or disks held in place by means of nuts $i'$. A fly-wheel $j$ is shown mounted upon the conical extremity of the section of shaft $d$, being keyed and held firmly in position by means of the nut $i'$.

The counterbalanced crank arms $i$ or disks may be secured to the shaft by means of keys, as illustrated. The crank arms or disks $i$ are connected together by means of crank-pins $k$, which also preferably have conical extremities and are firmly secured in position by such means as nuts $k'$.

Bearings $l\,l$ for carrying the cam-shafts $m$ are provided on each unit, the cam-shaft being similarly built up of sections. These bearings $l\,l$ are preferably carried in an extension $b^7$ of the crank-chamber $b$, which constitutes, with the crank-chamber, an oil-containing receptacle and is closed by means of a cover $b^8$.

The valve-rods pass through guide-bearings in the extension $b^7$ of the crank-chamber.

Each section of the cam-shaft $m$ is connected to the other by means of coupling-collars $o$.

The valve mechanism illustrated in the drawings and which is foreign to the subject-matter of the present invention is described in the specification of a pending application, Serial No. 17,744, filed May 23, 1900.

Figure 7:
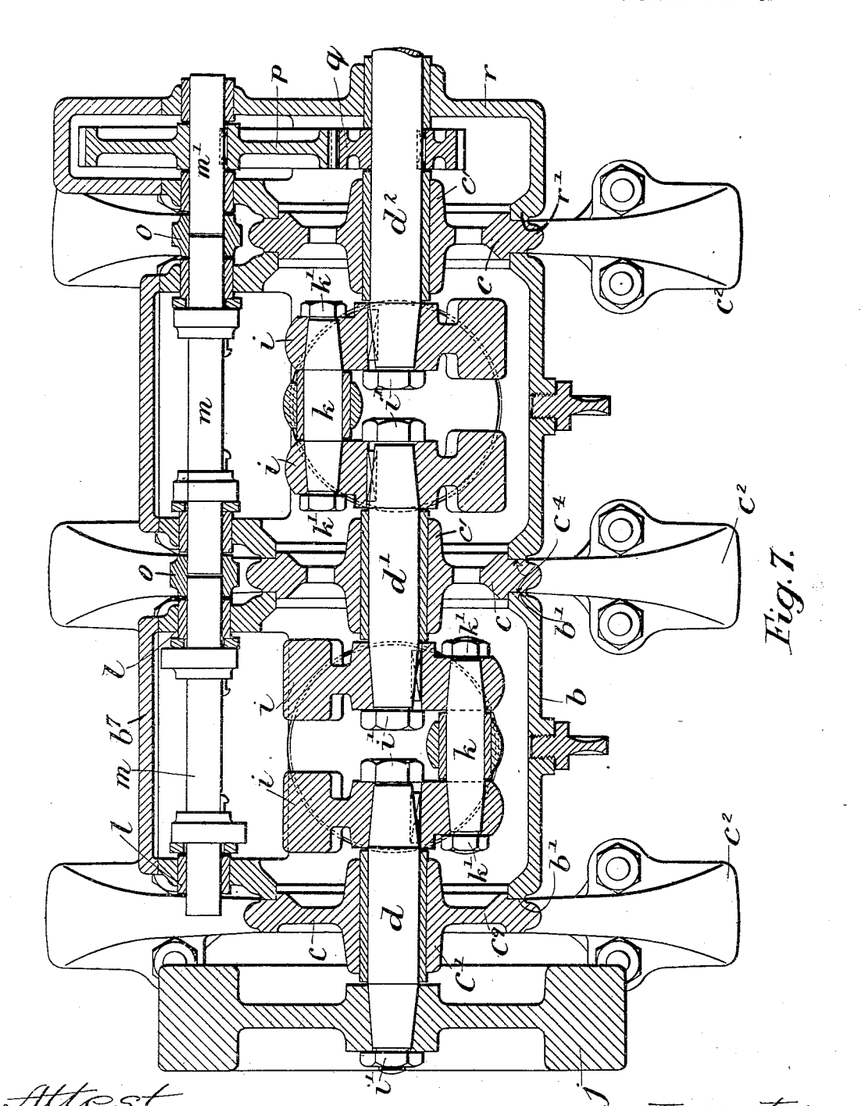
Fig. 7 is a sectional plan of a two-cylinder motor, showing cranks and crank-shafts and corresponding to Figs. 1, 5, and 6.

The ordinary two-to-one gear $p\,q$, Fig. 7, is arranged within and carried by an end cover or box $r$, which is connected to the adjacent crank-chamber by bolts substantially in the manner in which the crank-chambers are connected, a flange $r'$ with a facing being provided for abutting against the adjacent and intermediate cover or distance piece $c$. The extremity of the crank-shaft section $d^2$ is carried by the end cover or box $r$, as also is the section $m^1$ of the cam-shaft upon which the larger gear $p$ is mounted, the section $m'$ being connected to the adjacent section $m$ of the cam-shaft by means of a coupling-collar $o$. Any other gear employed in connection with the motor may be arranged in the same or a similar box $r$. For example, the reducing-gear illustrated in the modification of Fig. 8 and which forms the subject-matter of a pending application, Serial No. 17,744, filed May 23, 1900, may be contained within a box $r^3$, connected and provided with an end cover $c$ in a manner substantially the same as the adjacent crank-chambers.

The air inlet and exhaust pipes or passages are provided in sections, and each section is preferably cast on or formed as a port or passage within or on the cylinder-casting itself and has facings or flanges for bolting up the adjoining sections.

Figure 1:
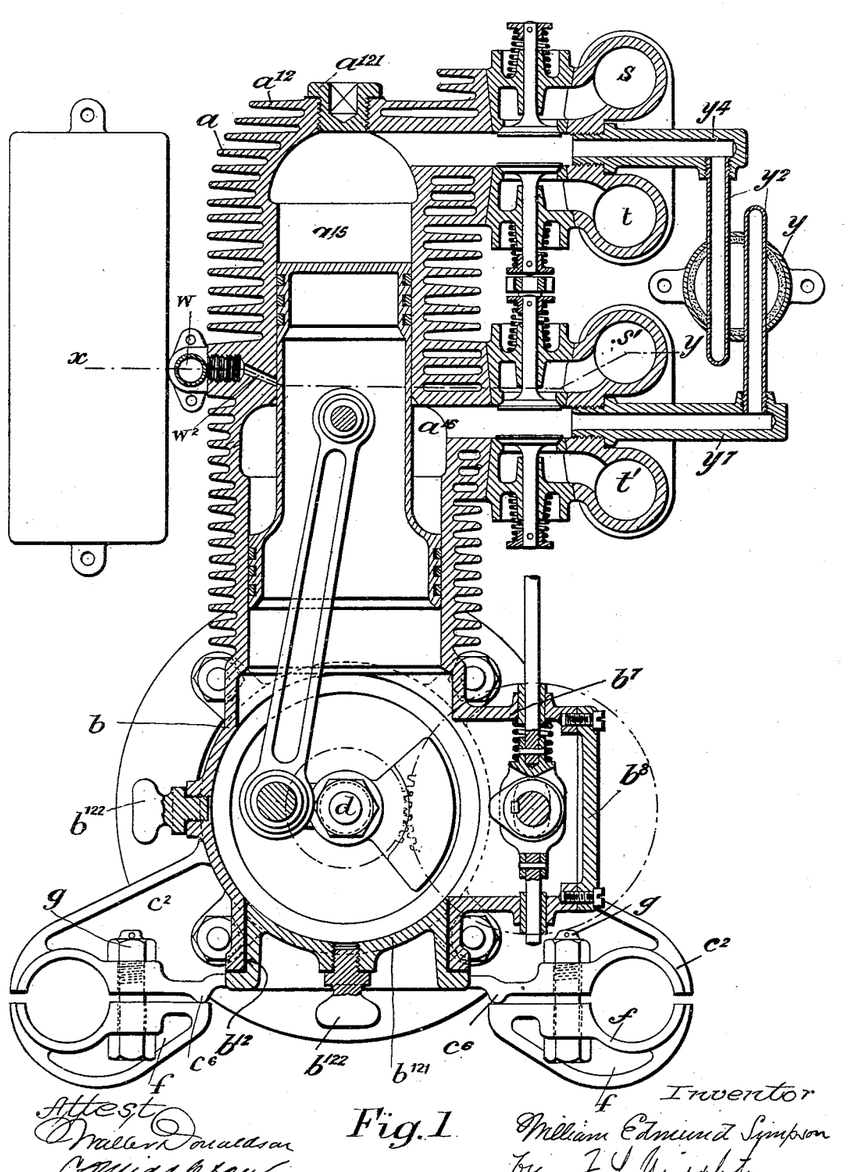
Figure 1 is a vertical section of an air-cooled motor.
Figure 2:
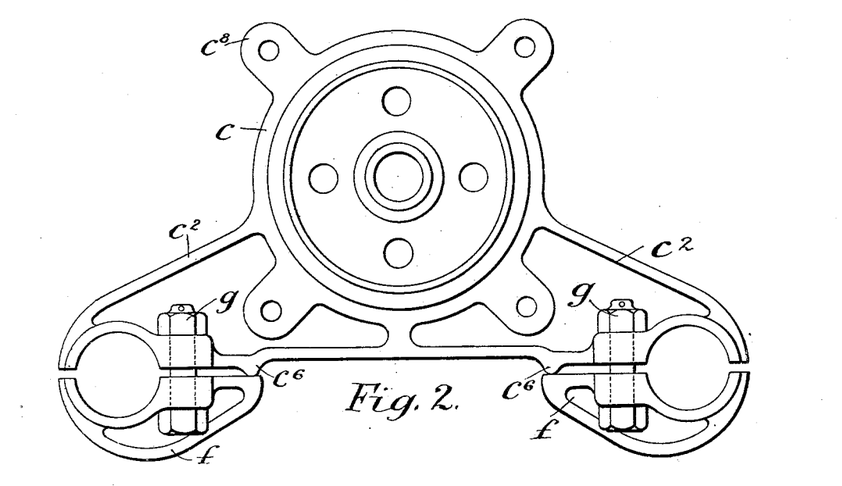
Figs. 2, 3, and 4 are an elevation, a cross-section, and a sectional plan, respectively, of the feet and end covers of the crank-chambers.
Figure 3:
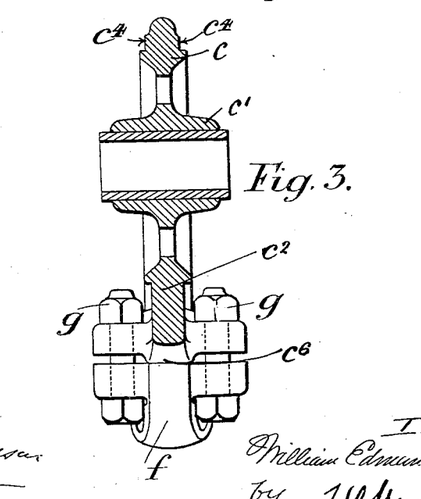
Figure 4:
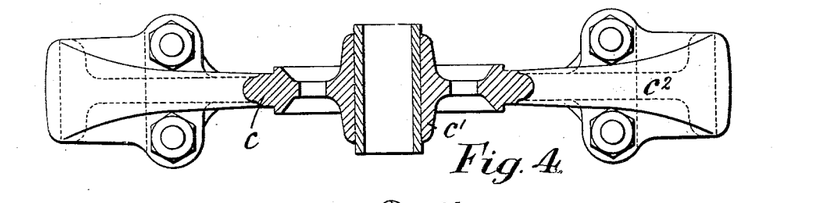
Figure 8A:
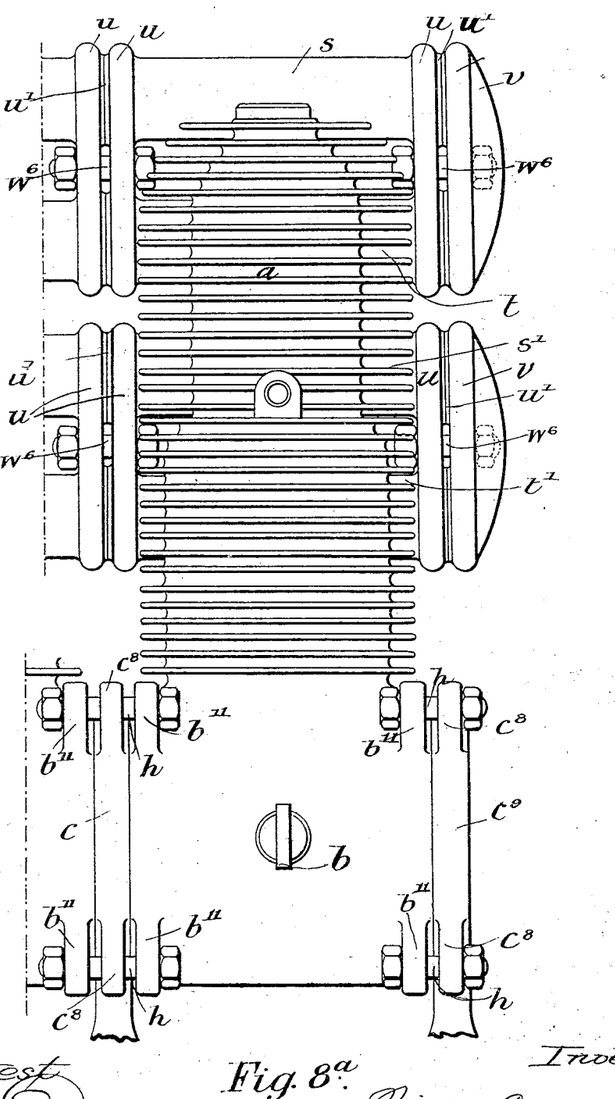
Figure 9:
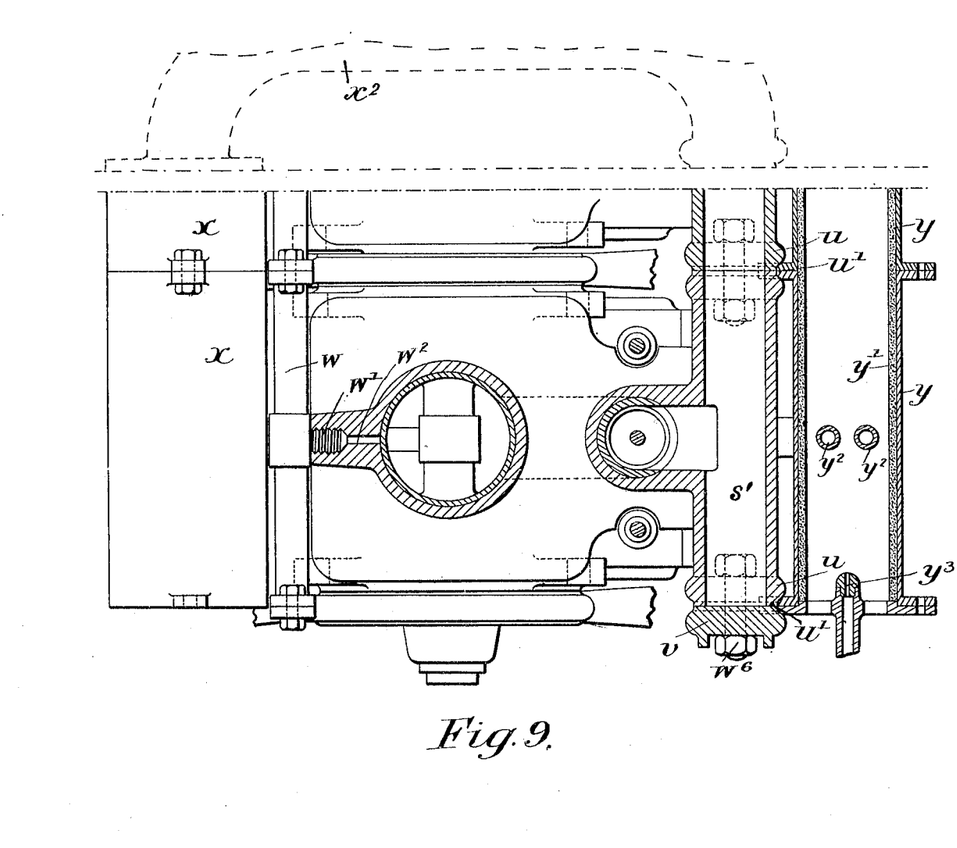
Fig. 9 represents a plan in section on the line X Y, Fig. 1.

As illustrated in Figs. 1, 8$^a$, and 9, the inlet and exhaust passages $s\,s'$ and $t\,t'$, respectively, are formed of a uniform length corresponding to that of the cylinder and chamber, with which they are cast integral, and the adjacent passages $s\,t$ and $s'\,t'$ are preferably connected together at their extremities by means of flanges $u$. The flanges $u$ have faced rims $u'$ for connecting up the adjoining sections by means of bolts $w^6$, passing through the contiguous flanges, one end of the passages being stopped by means of one cover-plate $v$, suitably bolted to the flange $u$, while the other end of the inlet-passage is conected by a suitable pipe $x^2$ (shown in dotted lines, Fig. 9) to the vaporizer $x$, and that of the exhaust-passage to a pipe connection, by means of which the exhaust-gases may be led away. Similarly the vaporizer $x$ may be made up in uniform sections bolted together, as illustrated, by means of bolts and flanges. The lubricating-oil-distributing pipes $w$ are also provided in uniform sections cast on the cylinders or formed separately and secured to the cylinder by means of a screwed boss or nipple $w'$, as illustrated, their extremities being provided with flanges, by means of which the contiguous sections may be secured in line one with the other. The oil may be fed into the cylinder through the passages $w^2$. When an incandescent ignition-lamp is employed, this may also be formed in uniform sections $y$, provided with flanges for the connection of one to the other. The lamp may be lined with refractory material $y'$ and have the ignition-tubes $y^2$ transversely projecting through it and may have one or two burners, such as $y^3$, or oil-jets provided at one or each end of the series of sections or otherwise disposed for heating the tubes.

In the motor illustrated two explosion-chambers $a^{15}$ and $a^{16}$ are provided, the ignition-tubes $y^2$ being arranged in connection with them and being secured to uniform tubular sections $y^4$ and $y^7$, screwed into the respective valve-casings to which the transverse sections of the tubes $y^2$ are screwed.

Figure 10:
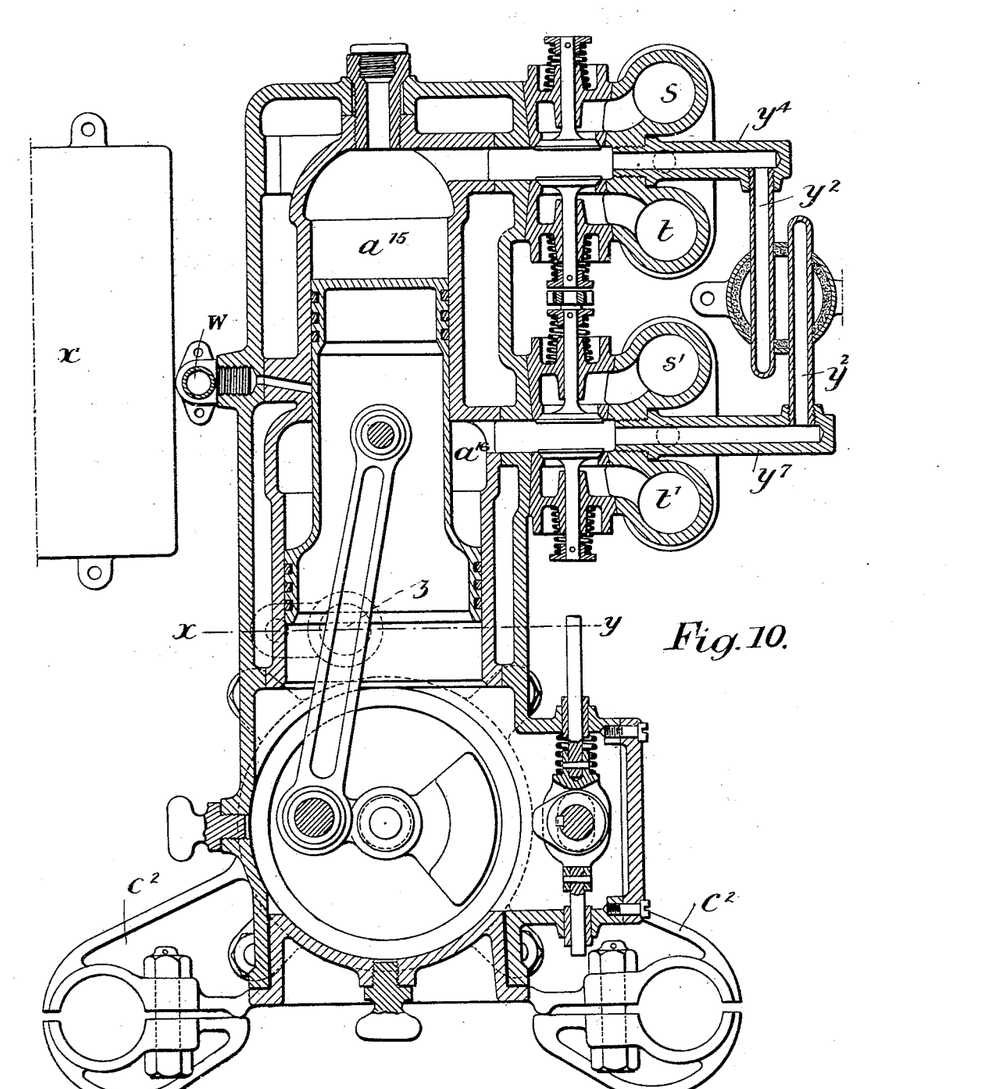
Figure 11:
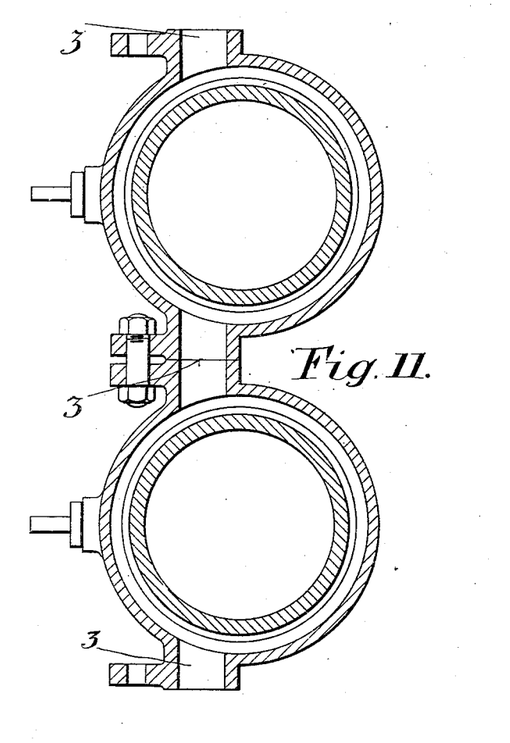

As illustrated in Figs. 10 and 11, the water-circulating ports or connections $z$ may be provided on the outer casing, so as to be uniform and so as thus to enable the respective cylinders, with their water-circulating ports or connections, to be bolted up together in series.

Figure 12:
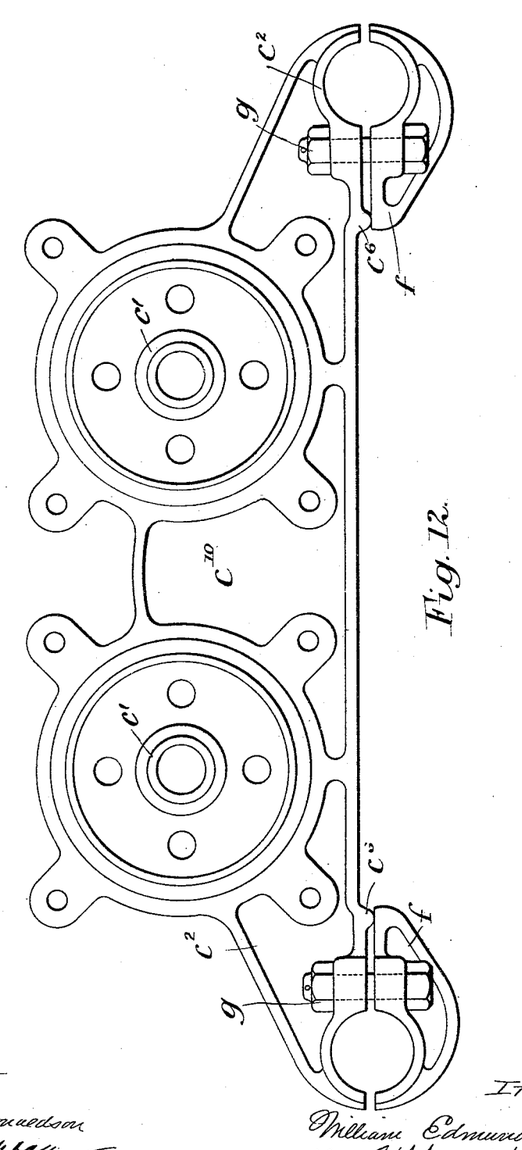
Fig. 12 is an elevation of crank-chamber cover and feet arranged for two sets of cylinders and crank-shafts side by side.

In some cases, as in vertical launch-motors, where the angle of the feet with relation to the cylinder-axis is not required to be varied, covers $c^{10}$, Fig. 12, carrying the bearings $c'$ and feet $c^2$, may be each adapted to receive two or more crank-chambers and crank-shafts arranged side by side. This arrangement is particularly adapted for multiple-screw propulsion.

The outer end or cover $a^{12}$ of the cylinder $a$, Fig. 1, may be cast on, leaving a hole only for boring or indicating purposes, such hole being afterward filled up by a screwed or other plug $a^{121}$. Another hole $b^{12}$, Fig. 1, is then provided in the opposite wall of the crank-chamber $b$, sufficiently large to admit the boring-head and to enable the cylinder to be bored. This opening is provided with a cover $b^{121}$ and utilized as an inspection-opening.

A screwed plug $b^{122}$ may be provided in the cover $b^{121}$ for the purpose of letting out oil, and a similar plug $b^{122}$ may be provided in the side of the crank-chamber $b$ for the same purpose and for use when the motor is horizontally mounted.

The dimensions of the crank-shaft may be so determined that any such number as six or eight may be built up with safety, the crank-shaft sections being uniform. So also the port areas are uniform and determined, so that no throttling shall occur when the full number of units are united.

The invention is not, of course, limited to the arrangement of the units side by side in the axial line of the crank-shaft, as it is obvious, for example, that such units may be so provided as to be connected in the direction transverse to that of a crank-shaft, as contemplated according to the arrangement of cover illustrated in Fig. 12.

Having now described my invention, what I claim as new, and desire to secure by Letters Patent, is—

1. A fluid-pressure motor comprising a cylinder and crank-chamber cast in one piece, inlet and exhaust ports upon said cylinder, said inlet and exhaust ports being cast in one with the cylinder and crank-chamber and arranged transversely to the axial line of the cylinder and entirely across the same to abut against the ports of adjacent cylinders, for the purposes and substantially as described.

2. In combination in a fluid-pressure motor, a plurality of cylinders with their inlet and exhaust ports, and incandescent-lamp-tube sections arranged to be coincident when the cylinders are assembled, said tube-sections extending entirely across and transversely of the cylinders and abutting, substantially as described.

3. In fluid-pressure motors, the combination of a plurality of cylinders having inlet and exhaust ports and vaporizer-sections upon said cylinders arranged to be coincident when the cylinders are assembled and connected together, said tube-sections extending entirely across and transversely of the cylinders and abutting, substantially as described.

4. In fluid-pressure motors, the combination of a plurality of cylinders having inlet and exhaust ports and sections of lubricating-oil-supply piping upon said cylinders arranged to be coincident when the cylinders are assembled and connected together, said tube-sections extending entirely across and transversely of the cylinders and abutting, substantially as described.

5. In fluid-pressure motors, the combination of a cylinder, a piston, a crank-shaft, a crank-chamber and a pipe or conduit extending transversely from one side of the cylinder to the other and open at each end, said pipe or conduit being arranged to abut against and coincide with a similar pipe on a cylinder located on either side of the cylinder first mentioned, substantially as described.

6. In fluid-pressure motors, the combination of a cylinder, a piston, a crank-shaft, a crank-chamber and a pipe or conduit extending transversely from one side of the cylinder to the other and open at each end, said pipe or conduit being arranged to abut against and coincide with a similar pipe on a cylinder located on either side of the cylinder first mentioned and a cover to inclose the remaining open end of the said pipe, substantially as described.

In witness whereof I have hereunto set my hand in presence of two witnesses.

WILLIAM EDMUND SIMPSON.

Witnesses:
WILLIAM EDWARD EVANS,
ELLIS OWEN.